(12) United States Patent
Cheng (10) Patent No.: US 11,004,053 B2
(45) Date of Patent: May 11, 2021

(54) INTELLIGENT SHOPPING CART, INTELLIGENT SHOPPING SYSTEM AND IMPLEMENT METHOD THEREFOR

(71) Applicant: XIAN CHAOHI NET TECHNOLOGY CO., LTD., Xi'an (CN)

(72) Inventor: Kun Cheng, Xi'an (CN)

( * ) Notice: Subject to any disclaimer, the term of this patent is extended or adjusted under 35 U.S.C. 154(b) by 173 days.

(21) Appl. No.: 16/327,863

(22) PCT Filed: Jan. 4, 2017

(86) PCT No.: PCT/CN2017/000101
§ 371 (c)(1),
(2) Date: Apr. 11, 2019

(87) PCT Pub. No.: WO2018/036075
PCT Pub. Date: Jan. 3, 2018

(65) Prior Publication Data
US 2019/0279185 A1    Sep. 12, 2019

(30) Foreign Application Priority Data
Aug. 26, 2016   (CN) .......................... 201610743188.8

(51) Int. Cl.
*G06Q 20/20* (2012.01)
*B62B 3/14* (2006.01)
(Continued)

(52) U.S. Cl.
CPC ......... *G06Q 20/208* (2013.01); *B62B 3/1416* (2013.01); *B62B 3/1424* (2013.01);
(Continued)

(58) Field of Classification Search
CPC ......... B62B 1/12; B62B 1/00; B62B 2206/04; B62B 5/0068; G06Q 30/06; G06Q 20/18; G06Q 20/20
(Continued)

(56) References Cited

U.S. PATENT DOCUMENTS 4,346,907 A * 8/1982 Swann ..................... B62B 1/12
280/47.18
6,725,206 B1 * 4/2004 Coveley ................. G01G 19/12
705/414
(Continued)

FOREIGN PATENT DOCUMENTS

| CN | 103707908 A | 4/2014 |
|---|---|---|
| CN | 104376655 A | 2/2015 |

(Continued)

*Primary Examiner* — Olusegun Goyea
(74) *Attorney, Agent, or Firm* — ZANIP (57) ABSTRACT

An intelligent shopping cart, an intelligent shopping system and an implementation method thereof. The intelligent shopping cart includes a cart body; and the cart body includes a storage unit and a handle, and further includes an intelligent terminal device configured on the handle. The intelligent terminal device is provided with a touchscreen computer having a display function and/or an operation function. The cart body is provided with an RFID tag for storing number information of the intelligent shopping cart. The cart body is further provided with a device in a communication connection to the touchscreen computer, and the device at least includes one or a combination of a weight sensor, a monitoring device, a code-scanning device, a positioning device, and a voice broadcasting device.

4 Claims, 4 Drawing Sheets

(51) Int. Cl.
*B62B 5/00* (2006.01)
*G06Q 20/32* (2012.01)
*G06Q 30/06* (2012.01)

(52) U.S. Cl.
CPC ....... *B62B 5/0096* (2013.01); *G06Q 20/3278* (2013.01); *G06Q 30/06* (2013.01)

(58) Field of Classification Search
USPC ........ 1/1; 705/23, 16, 414; 235/375, 462.08; 280/47.18, 47.28, 47.29
See application file for complete search history.

(56) References Cited

U.S. PATENT DOCUMENTS

| | | | | |
|---|---|---|---|---|
| 2013/0223673 | A1* | 8/2013 | Davis | G06Q 30/00 |
| | | | | 382/100 |
| 2016/0132854 | A1* | 5/2016 | Singh | G07G 1/0036 |
| | | | | 705/23 |
| 2016/0260161 | A1* | 9/2016 | Atchley | G05D 1/04 |
| 2017/0243186 | A1* | 8/2017 | Cleper | G01G 19/4144 |
| 2017/0249491 | A1* | 8/2017 | MacIntosh | G06Q 10/087 |

FOREIGN PATENT DOCUMENTS

| | | |
|---|---|---|
| CN | 104787102 A | 7/2015 |
| CN | 204605901 U | 9/2015 |
| CN | 105083354 A | 11/2015 |

\* cited by examiner

Fig. 4

INTELLIGENT SHOPPING CART, INTELLIGENT SHOPPING SYSTEM AND IMPLEMENT METHOD THEREFOR

CROSS REFERENCE TO THE RELATED APPLICATIONS

This application is the national phase entry of International Application No. PCT/CN2017/000101, filed on Jan. 4, 2017, which is based upon and claims priority to Chinese Patent Application No. 201610743188.8, filed on Aug. 26, 2016, the entire contents of which are incorporated herein by reference.

TECHNICAL FIELD

The present invention belongs to the technical field of intelligent shopping carts at supermarket, and particularly relates to an intelligent shopping cart, an intelligent shopping system and an implementation method thereof.

BACKGROUND

At present, there are tens of thousands of types of commodities in various large supermarkets in China. With the expansion of the scale of supermarkets and the diversification of shopping choices of consumers, problems such as unable to quickly find the exact goods to buy in the supermarket, insufficient understanding of the commodity information of commodities in similar category but different brands, unclear of the quantities and detailed prices of the commodities purchased in the intelligent shopping car, waiting in a long queue at the side of checkout counter for settlement during the peak period of shopping, etc. will be encountered. The existing intelligent shopping cart reads nearby commodities via RFID (radio frequency identification devices), resulting in that dozens or tens of catalogues of commodities on the nearby shelves are displayed on the screen, which fundamentally changes the shopping habits of users, and results in a large number of commodities and a high selection error rate during a selection. Since dozens of commodities are read at a time, the reaction speed is bound to slow down. Moreover, when encountering fresh or other weighing commodities, because the price is uncertain, if an RFID tag is attached to each weighing commodity, the cost will be greatly increased, and such practical problems cannot be solved. The anti-theft problem cannot be solved simply by relying on the pressure measurement and control. There are many commodities with the same weight but different prices in the supermarket. For example, many commodities have the same specification, but the prices of the commodities differ by several RMB or even hundreds of RMB. Relying only on the weight, the error rate is very high, which brings the opportunity for some dishonest users to confuse one commodity with another, thereby bringing losses to the supermarket.

SUMMARY

The technical problem to be solved by the present invention is to provide an intelligent shopping cart with an intelligent weighing function, a fast checkout function and a precise calculation function.

Further, the technical problem to be solved by the present invention is to provide an intelligent shopping system for rapid deployment and use in supermarkets.

To solve the above technical problems, the present invention provides an intelligent shopping cart, including a cart body; and the cart body includes a storage unit and a handle. The intelligent shopping cart further includes an intelligent terminal device configured on the handle. The intelligent terminal device is provided with a touchscreen computer having a display function and/or an operation function. The cart body is provided with an RFID tag for storing number information of the intelligent shopping cart. The cart body is further provided with at least one or a combination of a weight sensor, a monitoring device, a code-scanning device, a positioning device, and a voice broadcasting device which is in a communication connection to the touchscreen computer. The weight sensor is configured to collect weight information of a commodity and send it to the touchscreen computer. The monitoring device is configured to read barcode information of the commodity and/or record image information of the commodity, and send the information to the touchscreen computer. The code-scanning device is configured to read barcode information of the commodity and send it to the touchscreen computer. The positioning device is configured to receive a signal sent by an LED positioning light arranged in a supermarket, decode the signal and send the decoded signal to the touchscreen computer. The voice broadcasting device is configured to play a voice prompt of a shopping operation to a user. The touchscreen computer is configured to send out the weight information of the commodity, the barcode information of the commodity and/or the image analysis information of the commodity after receiving them, and display the corresponding information of the commodity after receiving a confirmation instruction; or, the touchscreen computer is configured to receive the weight information of the commodity, the barcode information of the commodity and/or the image information of the commodity to compare them with the original information of the commodity, and then display the comparative information of the commodity.

Further, the monitoring device is located at the bottom of the intelligent terminal device or at one or more different positions of a shopping device, and the field of view of each monitoring device is oriented toward the inside of the shopping device for recording image information of the commodity from multiple angles.

Further, the intelligent shopping cart further includes a smart bracelet in a communication connection to the touchscreen computer, and the smart bracelet is internally provided with an RFID tag reader for non-contact reading of price information of the commodity, and transmission of the price information for display on the touchscreen computer.

Further, the intelligent shopping cart is further provided with a charging device. The charging device is configured to cooperate with an external charging equipment to provide electric energy for the components of the intelligent shopping cart that require power supply driving.

Further, the bottom of the shopping device is provided with the weight sensor and a battery. The battery is configured to provide electric energy for the components of the intelligent shopping cart that require power supply driving.

Further, the intelligent terminal device is provided with an NFC payment device for payment.

Based on the above description, the present invention further provides an intelligent shopping system, including the intelligent shopping cart, a server arranged in a supermarket or on the intelligent shopping cart, and an ultra-high-frequency radio frequency reader arranged at an exit/entrance of the supermarket and in a communication connection to the server.

The ultra-high-frequency radio frequency reader is configured to read the number information of the intelligent shopping cart stored in the RFID tag, and send the number information to the server.

The server, interacting with the touchscreen computer, is configured to store the original information of the commodities, receive the on-site information sent by the intelligent shopping cart, compare the on-site information with the corresponding original information, and finally send the prompt information obtained after comparison to the touchscreen computer.

Further, the intelligent shopping system further includes an anti-theft system, and the anti-theft system includes a loadometer arranged at an exit/entrance of the supermarket and in a communication connection to the server.

The loadometer is configured to measure the weight information of the intelligent shopping cart and/or the user when entering and leaving the supermarket, respectively, and send the weight information to the server.

In addition, the present invention further provides a method for implementing an intelligent shopping system, including the following steps:

Step 1: when entering the entrance of the supermarket, recording the number information of the intelligent shopping cart, user information, and original total weight information $m_1$ of the user and the intelligent shopping cart by the server, and then opening entrance gate;

Step 2: for the commodity to be purchased, first using the code-scanning device to read the barcode information of the commodity, or using the smart bracelet to read the commodity information; and then putting the commodity into the shopping device, and simultaneously sending the commodity information to the server wirelessly to retrieve the original information of the corresponding commodity;

Step 3: recording on-site information of the commodity selected in step 2, the on-site information includes the commodity weight information acquired by the weight sensor, and the commodity image information collected and analyzed by the monitoring device; and then sending the on-site information to the server and comparing the on-site information with corresponding original information saved in the server;

when the on-site information is consistent with the original information, including the selected commodity into the commodity purchase list and displaying the selected commodity on the touchscreen computer;

otherwise, prompting that the commodity information is wrong by the touchscreen computer;

Step 4: repeating steps 2 and 3, sending weight information of all commodities in the intelligent shopping cart to the server by the intelligent shopping cart, and obtaining the total weight information $m_2$ of the selected commodities;

Step 5: after the shopping is completed, reading the number information of the intelligent shopping cart by the ultra-high-frequency radio frequency reader arranged at the exit of the supermarket, and at this time, weighing the total weight of the user, the selected commodities and the intelligent shopping cart by the loadometer to obtain the final total weight information $m_0$;

Step 6: comparing the sum of the original total weight information $m_1$ obtained in the step 1 and the total weight information $m_2$ of the commodities obtained in the step 4 with the final total weight information $m_0$ obtained in the step 5;

if $m_1+m_2=m_0$, sending payment information to the touchscreen computer by the server, and the user pays through the mobile phone or the NFC payment device on the intelligent shopping cart; after the payment is completed, opening the exit gate; and if $m_1+m_2 \neq m_0$, sending an alarm message to the touchscreen computer by the server.

Further, the method of step 1 is specifically: recording the number information of the intelligent shopping cart through reading the RFID tag on the intelligent shopping cart by the ultra-high-frequency radio frequency reader arranged at the entrance; then realizing user login by inputting the mobile phone number, scanning the personal QR code, or scanning the scan code of WeChat through the touchscreen computer on the intelligent shopping cart; subsequently, reading the total weight information $m_1$ of the user and the intelligent shopping cart by the weight sensor of the intelligent shopping cart; and sending the number information, the login information and the total weight $m_1$ to the server through the touchscreen computer.

Beneficial effects of the present invention:

1) The intelligent shopping cart includes the weight sensor configured for collecting commodity weight information and sending it to the touchscreen computer. Through the weight sensor, the total weight of the commodities in the shopping cart can be quickly and accurately obtained no matter the shopping cart is in a stationary state or in a walking process. In addition, the weight information of the commodities in the intelligent shopping cart are collected by the weight sensor, the commodity information data pre-recorded in the server is retrieved by the code-scanning device, and the commodity image information is collected by the monitoring device. By tracking the movement trails of commodities through image information, and weight comparison, two-way verification can be carried out on the selected commodities to ensure the accuracy of commodity identification results. The intelligent shopping cart realizes one-to-one instant reading of the commodity through the code-scanning device without changing the current shopping habits of users, and can further read the barcode information of the pre-purchased commodity through the camera. For the commodities recorded by pasting RFID tags on the price tags, the intelligent shopping bracelet can be directly used to read the information. Users can pick up the commodities at will when they choose the commodities. When users have the intention to buy the commodities, they only need to put the bracelet close to the price tags, and the specific information of the commodities can be displayed on the screen of the intelligent shopping cart.

2) Since, in the intelligent shopping cart, the RFID tag for storing number information of the intelligent shopping cart is provided on the cart body, the information of the intelligent shopping cart can be obtained using the RFID tag; and at the same time, by cooperating the RFID tag with the loadometer arranged at the exit/entrance of the supermarket, the total weight information of the intelligent shopping cart and the user can be calculated, thereby reducing the number of occurrences of illegal activities such as entrainment and theft.

3) Since the NFC payment device for payment is provided on the intelligent terminal device, the payment manners such as the NFC payment, the credit card payment, the WeChat payment, and the Alipay payment can be supported, thereby improving self-service settlement efficiency of users and solving the problem of user experience. The intelligent shopping cart can further realize the innovative modes of binding membership card, real-name shopping, mobile phone online shopping and supermarket delivery through installation of intelligent APP software, and completely solve the problem of slow payment speed at the current stage through mobile payment.

4) Since the shopping cart includes the positioning device for receiving a signal sent by the LED positioning light arranged in the supermarket, decoding and sending the information to the touchscreen computer. Through receiving the information sent by the surrounding LED positioning illumination lamp, the location of shopping cart in the supermarket can be calculated, the commodity advertisements in the area can be accurately displayed to the user, and a path navigation for finding the target commodity can be provided for the user. The system realizes positioning by receiving signal information sent by an LED positioning light deployed in a supermarket, decoding the signal information, and then sending the decoded signal information to the server. Also, the system can realize the positioning by receiving signals sent by the Bluetooth positioning device and the UWB positioning device, deployed in the supermarket, encoding and decoding the signals, and then sending the encoded and decoded signals to the server.

5) The intelligent shopping cart system of the present invention not only solves the supermarket concerns but also ensures the safety and convenience of users because the storage unit provided on the intelligent shopping cart is convenient for the users to store the personal belongings. In addition, several intelligent shopping carts can be placed together in an insertion manner, thereby saving the space for placement and meeting the need for multiple shopping carts to be simultaneously charged in parallel. Further, through the collection of user information and shopping information, big data analysis is carried out to obtain information of various links such as supply, sales, storage, and production of commodities and improve the value.

In the drawings, 1. handle, 2. peripheral charging port, 3. intelligent terminal device, 4. storage unit, 5. weight sensor, 6. shopping device, 7. RFID tag, 8. monitoring device, 9. code-scanning device, 10. charging device, 11. voice broadcasting device, 12. positioning device, 13. touchscreen computer, 14. NFC payment device, 15. battery.

DETAILED DESCRIPTION OF THE EMBODIMENTS

The principles of the present disclosure will be described with reference to some exemplary embodiments. It should be understood that these embodiments are described only for the purpose of illustration and helping those skilled in the art understand and implement the present disclosure, and are not intended to suggest any limitation to the scope of the present disclosure. The content of the present disclosure described herein can be implemented in various ways other than those described below.

As described herein, the term "include/including" and its various variants may be understood as an open-ended term, which means "include/including but not limited to". The term "based on" can be understood as "at least partially based on". The term "one embodiment" can be understood as "at least one embodiment". The term "another embodiment" can be understood as "at least one other embodiment".

Figure 1:
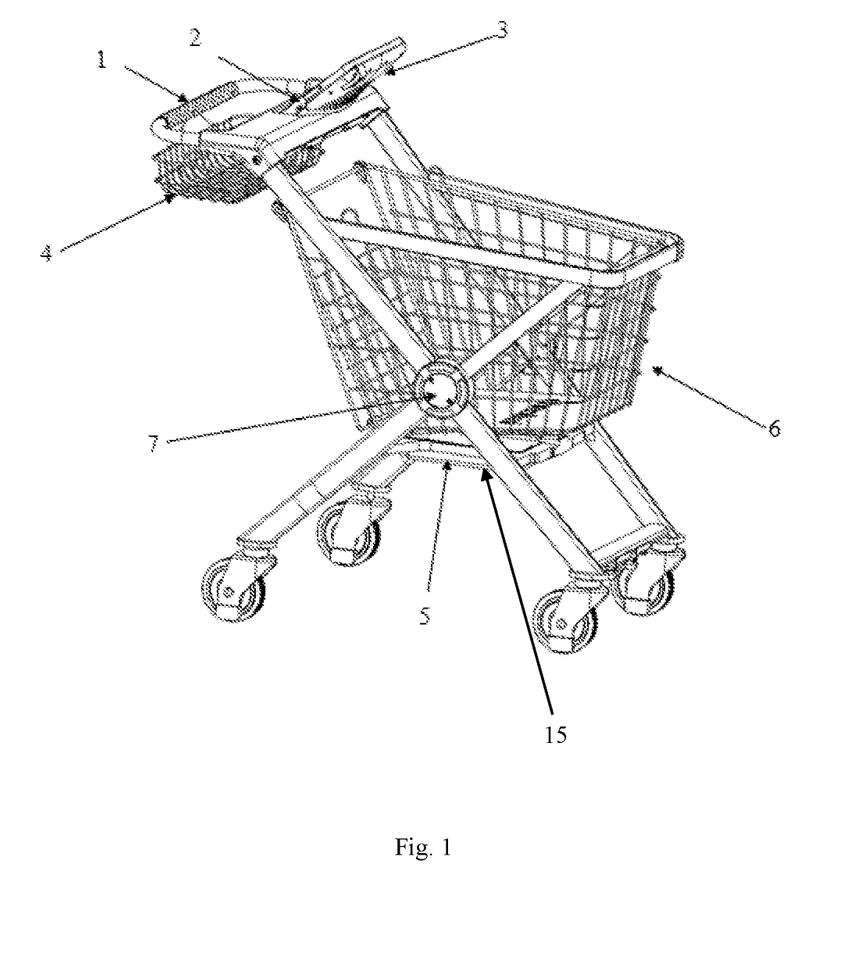
FIG. 1 is a front view of an intelligent shopping cart of the present invention.
Figure 2:
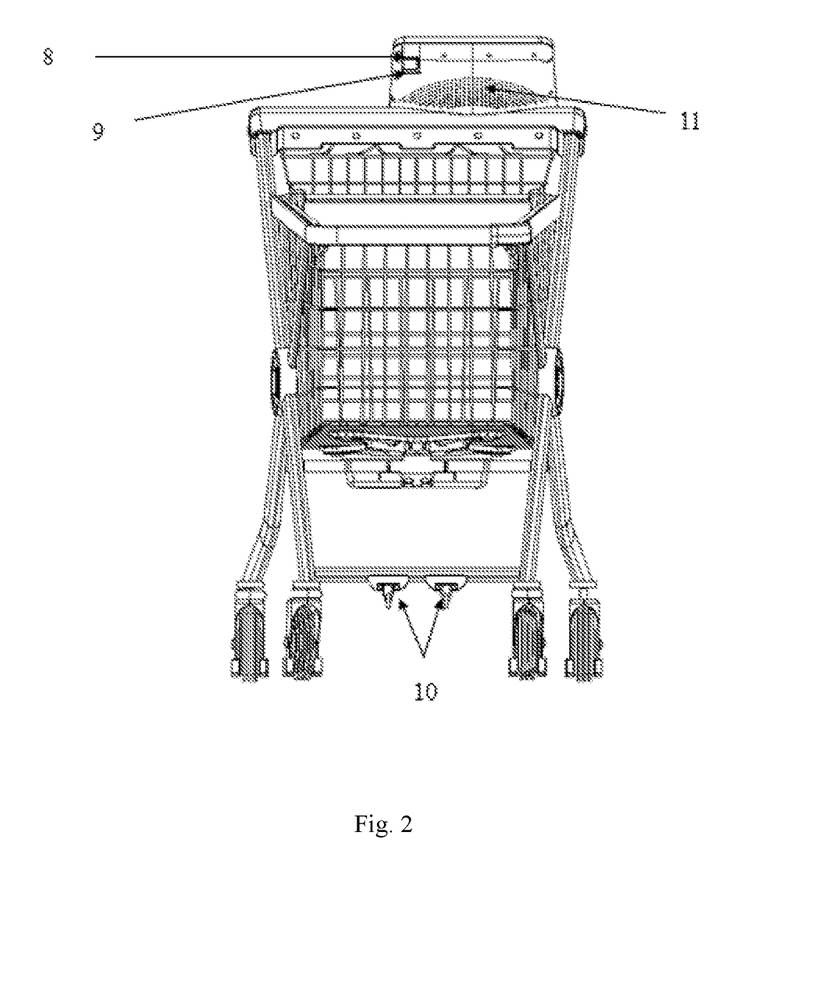
FIG. 2 is a left view of an intelligent shopping cart of the present invention.
Figure 3:
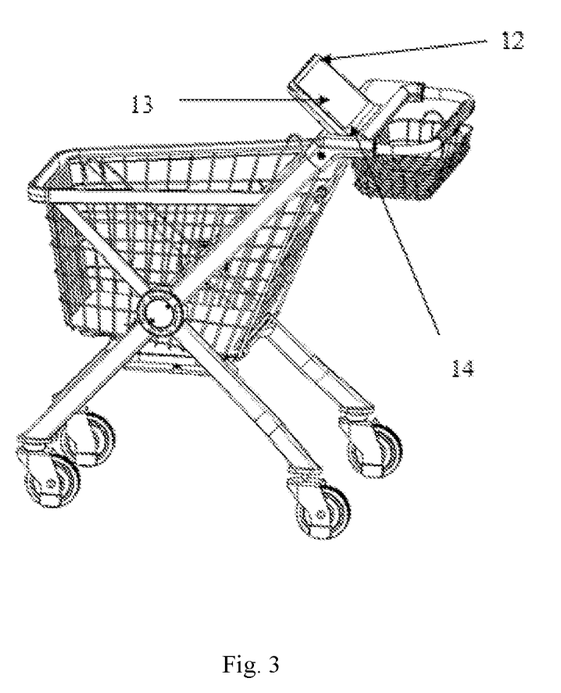
FIG. 3 is a rear view of an intelligent shopping cart of the present invention.

Referring to FIGS. 1-3, an intelligent shopping cart is provided in this embodiment, including a cart body. The cart body includes a storage unit 4 and a handle 1 arranged on one side of the storage unit 4. The cart body is provided with an RFID tag 7 for storing information of the intelligent shopping cart. When the intelligent shopping cart enters a supermarket, number information of the intelligent shopping cart can be retrieved by reading the RFID tag 7. A weight sensor 5 for collecting the weights of commodities is provided on the cart body. The weight sensor 5 can be configured at the bottom of the shopping device 6 or at other locations, and the weight sensor 5 sends the collected weight information to an intelligent terminal device 3. The intelligent terminal device 3 is configured on the handle 1. The intelligent terminal device 3 is provided with a touchscreen computer 13 in communication connections to the weight sensor 5, a monitoring device 8, a code-scanning device 9, a voice broadcasting device 11, and a positioning device 12. The code-scanning device 9 is configured to read barcode information of the commodity and send it to the intelligent terminal device 3. The touchscreen computer 13 has a display function and/or an operation function, and can display a shopping list, user information, commodity information, payment information, etc., which is configured to comprehensively process information using the algorithm in a shopping cart system after receiving one or more information such as the weight information of the commodity sent by the weight sensor 5, barcode information of the commodity sent by the code-scanning device 9, and image information of the commodity collected by the monitoring device 8, and display the corresponding information after calculating the result. Alternatively, the touchscreen computer 13 is configured to compare the weight information of the commodity sent by the weight sensor 5, the barcode information of the commodity sent by the code-scanning device 9, and/or the image information of the commodity collected by the monitoring device 8 with the original information of the commodity stored in the touchscreen computer 13 after receiving them. After the comparative result of the received information with the original information is consistent, the corresponding commodity information is displayed by the touchscreen computer 13 and broadcasted by the voice broadcasting device 11. If the comparative result is inconsistent, the message prompting that the commodity information is wrong is displayed by the touchscreen computer 13 and broadcasted by the voice broadcasting device 11. A plurality of positioning devices 12 are arranged at different positions of the cart body. Each positioning device 12 can be configured at the top of the intelligent terminal device 3 or on the shopping device 6. The angle of each positioning device 12 is directed toward the roof of the supermarket or the shopping shelf. The positioning devices 12 are used in combination for receiving the signals sent by the positioning devices arranged in the supermarket from multiple views, and sending the received signals to the intelligent terminal device 3. A plurality of monitoring devices 8 are arranged at different positions on the cart body. Each monitoring device 8 can be configured at the bottom of the intelligent terminal device 3 or on the shopping device 6. The shooting angles of all monitoring devices 8 are directed toward the inside of the shopping device 6. The monitoring devices 8 are used in combination for recording the appearance characteristics of the commodities placed in the shopping device 6 from multiple angles, and sending the image information of the appearance characteristics to the intelligent terminal device 3. The code-scanning device 9 is configured for directly reading the barcode information of the commodity and sending it to the intelligent terminal device 3. The intelligent terminal device 3 or other locations of the intelligent shopping cart is provided with an NFC payment device 14 for payment, which can perform a quick payment when the user needs to pay. The NFC payment device 14 is in a communication connection to the server that calculates the payment amount. After receiving payment confirmation information sent by the server, the payment of the shopping list can be completed by the NFC payment device 14. In addition, the bottom of the intelligent shopping cart is provided with a charging device 10 for cooperating with an external charging equipment to provide electric energy for the components of the intelligent shopping cart that require power supply driving. The charging device 10 can be used for wireless charging in places up to tens of centimeters away from the charger without the aid of wires, which is convenient to use. The bottom of the shopping device 6 is further provided with a battery 15. The battery 15 is configured to provide electric energy for the components of the intelligent shopping cart that require power supply driving. Among them, the components of the intelligent shopping cart that require power supply driving includes: the intelligent terminal device 3, the weight sensor 5, the monitoring device 8, the code-scanning device 9, the voice broadcasting device 11, the positioning device 12, the NFC payment device 14, etc.

The above-described intelligent shopping cart can be implemented by the following steps:

Step 1: After the user selects the product, the commodity barcode is placed in front of the code-scanning device 9 for reading. Meanwhile, the picture information of the commodity is started to be collected and analyzed by the monitoring device 8 until the user puts the commodity into the shopping device 6 or the time for the user to place the commodity has passed. The on-site information of the commodity to be purchased, that is, the weight of the commodity, the commodity information and the image information in the shopping device 6, is respectively acquired by the weight sensor 5, the code-scanning device 9 and the monitoring device 8 provided on the intelligent shopping cart; and the on-site information is sent to the intelligent terminal device 3 for comparison with the original information. Namely, when the on-site information is consistent with the original information, the selected commodity is added into the commodity purchase list and displayed on the touchscreen computer 13. If the commodity information is inconsistent with the original information, the commodity information is transmitted to the server through the network for recording, meanwhile, the user is prompted that the placed commodity is wrong and the correct commodity needs to be re-put, by the touchscreen computer 13. If the user puts the inconsistent commodities for many times, the shopping cart can be locked, the user can be prohibited from entering and exiting, and alerting is sent to the supermarket management personnel.

Step 2: The original information of the commodity can be stored in the touchscreen computer 13. After receiving the weight information, barcode information and/or image analysis information of the commodity selected by the user, the touchscreen computer compares them with the original information of the commodity. If the information comparative result of the received information with the original information is consistent, the corresponding commodity information is displayed on the touchscreen computer 13; if the information comparative result is inconsistent, the message prompting that the commodity information is wrong is displayed on the touchscreen computer 13.

Step 3: The user can store the personal belongings that need to be stored in the storage unit 4 of the intelligent shopping cart, and has no need to go to the storage cabinet to queue up for storage.

Figure 4:
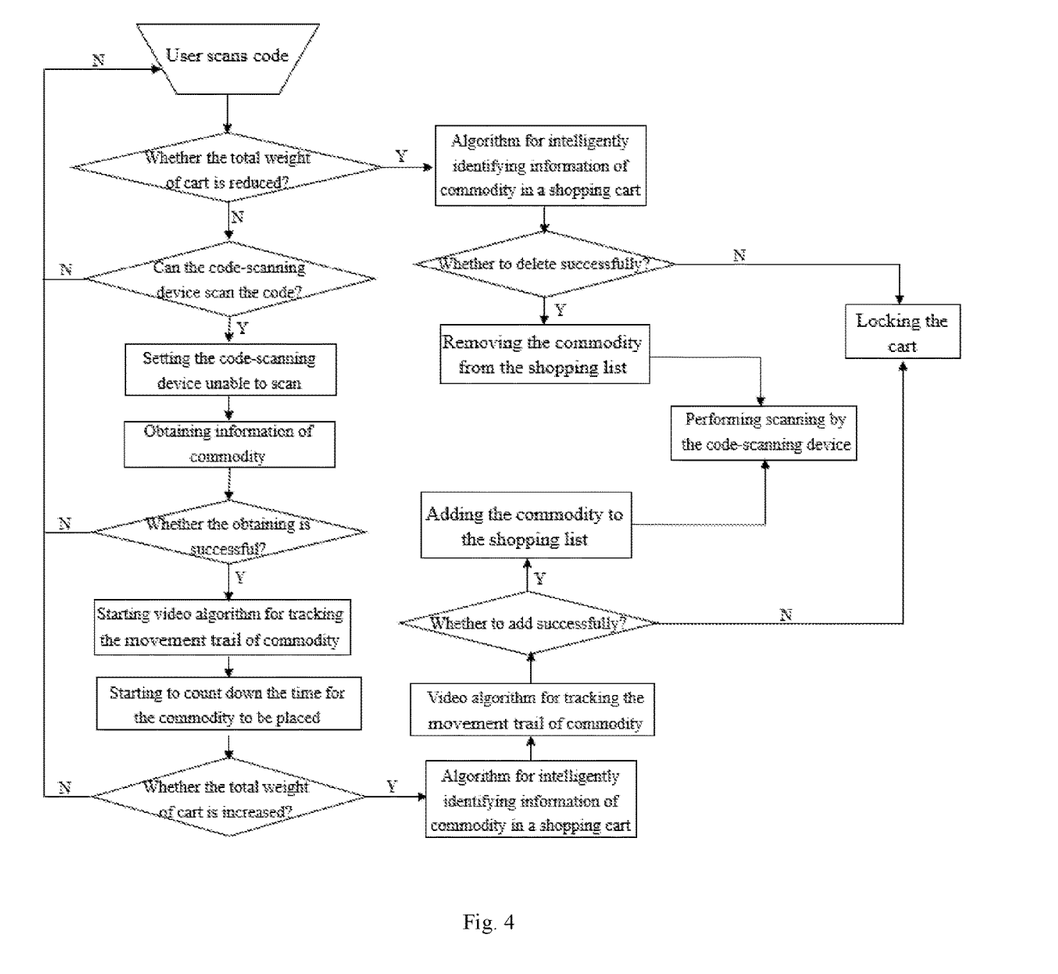
FIG. 4 is a work flow diagram of an intelligent shopping system of the present invention.

Referring to FIG. 4, a work flow diagram of an intelligent shopping system of the present invention is provided. In this embodiment, the intelligent shopping system includes the aforementioned intelligent shopping cart, and further includes an anti-theft system used in the intelligent shopping system. The anti-theft system includes a loadometer arranged at an exit/entrance of the supermarket and in a communication connection to the server. The loadometer is configured to measure the weight information of the intelligent shopping cart and/or the user when entering and leaving the supermarket, respectively, and send the weight information to the server for comparison.

The specific method for comparison described above includes: after several commodities are placed in, obtaining the total weight $m_2$ of the accumulated commodities; when the user completes the shopping and moves towards the automatic settlement exit, weighing the total weight of the user, the placed commodities and the intelligent shopping cart through the loadometer in front of the gate to obtain the final total weight information $m_0$; meanwhile, sending the information to the server; and performing weight check and calculation by comparing the sum of the original total weight $m_1$ of the user and the intelligent shopping cart weighted when entering the supermarket and the total weight information $m_2$ of the purchased commodities with the final total weight information $m_0$;

1-1) if $m_1+m_2=m_0$, sending a payment confirmation message to the user's smartphone through the server, prompting the user whether the total price of the purchased commodities is paid; and the user pays through the smartphone or the NFC payment device 14 on the intelligent shopping cart; after the payment is completed, opening the exit gate; and 1-2) if $m_1+m_2 \neq m_0$, it means that there is an abnormality, sending an alarm message to the security inspector to check. Among them, the original information and the on-site information involved in the present invention include the weight, image, barcode and price of the commodity, and/or the number information of the intelligent shopping cart, etc.

As a preferred solution in this embodiment, the intelligent system is further configured with the following algorithm for weight identification of commodities.

2-1) The intelligent shopping system is configured for a real-time acquisition of three-axis acceleration of a three-axis acceleration sensor on the intelligent shopping cart. When the intelligent shopping cart is in a stationary state, assume the static accelerations of x, y, and z axes are ax, ay, and az, respectively. When the intelligent shopping cart is moving, the differences between the real-time accelerations and the static accelerations of three axes are ax$\Delta$, ay$\Delta$, and az$\Delta$, respectively. When the differences ax$\Delta$, ay$\Delta$, and az$\Delta$ are within a predetermined range, the intelligent shopping cart is considered to be in the stationary state; otherwise, the intelligent shopping cart is in a motion state.

2-2) A specific method used by the intelligent shopping system to collect data from the weight sensor is as follows:

when the shopping cart is in a stationary state, the values collected by the weight sensor are all started with "st", that is, the collected values can be used as the actual total weight of the commodities;

when the shopping cart moves smoothly, the average value of several weight data collected by the weight sensor within 2 seconds is taken as the actual total weight of the commodities;

when the shopping cart is moving strenuously, the values collected by the weight sensor cannot be used as the actual total weight of the commodities; and when the shopping cart changes from a moving state to a stationary state, and the weight sensor collects six consecutive and identical values starting with "st", the weight values read by the weight sensor are stable and accurate, and the values can be used as the actual total weight of the commodities.

The above-described method further includes: after obtaining the reported data of the weight sensor, first storing the reported data in a motion data array; if the data starts with "st", storing the data in a static data array; if not, clearing the static data array. When the static data array includes 6 data, and the data are all equal to each other, the actual weight of the commodities can be output, and the motion data array is cleared at the same time. Otherwise, after the data of the motion data array reaches a certain number, the average value of the data, i.e., the actual total weight of the commodities, is calculated.

2-3) The intelligent shopping system is configured for receiving the commodity barcode information sent by the code-scanning device, and sending the commodity barcode information to the server to request the original information of the commodity.

Further, the specific method of determining the user's operation action on the selected commodity by receiving the data sent by the weight sensor is as follows.

The total weight of the commodities in the shopping cart is continuously detected in real time by the weight sensor. When the shopping cart is in an unlocking state, the total weight of the commodities in the shopping cart is continuously detected in real time by the weight sensor.

The total weight $m_{n+1}$ of the commodities in the shopping cart is continuously detected and obtained by the weight sensor. The total weight $m_{n+1}$ of the commodities is compared with the total weight $m_n$ of the commodities obtained after the previous selection behavior is completed to obtain the variation value $m_A$ of the total weight of the commodities. When $m_A>0$, it can be determined that the commodity to be purchased is placed in the shopping cart; when $m_A<0$, it can be determined that the commodity to be purchased is taken out from the shopping cart; and when $m_A=0$, it can be determined that there is no operation on the commodities to be purchased.

Further, the absolute value $|m_A|$ of the variation value is compared with the standard weight $m_0$. Specifically, the absolute value $|m_A|$ is the actual weight of the commodities to be purchased.

If $|m_A|$ falls within the interval value $m_{min}$-$m_{max}$ of $m_0$, it is determined that $|m_A|$ is consistent with $m_0$, namely, the commodity identification result is: the obtained pre-stored information of commodity is consistent with the information of the commodity to be purchased, and the action information of determination is correct. Then, for the commodities to be purchased that are determined as being placed in the shopping cart, the pre-stored information thereof is saved in the shopping list. For the commodities to be purchased that are determined as being taken out from the shopping cart, the pre-stored information of the commodities to be purchased is prompted to be deleted from the shopping list.

If $|m_A|$ is outside the interval value $m_{min}$-$m_{max}$ of $m_0$, it is determined that $|m_A|$ is inconsistent with $m_0$, namely, the commodity identification result is: the obtained pre-stored information of commodity is inconsistent with the information of the commodity to be purchased, and/or the action information of determination is incorrect. Then, prompting that the commodity information is wrong is performed, and the shopping cart is automatically locked.

As a preferred solution in this embodiment, the intelligent shopping system is further configured with the following algorithm for image identification of commodities.

3-1) The monitoring device 8 is placed at a position where the picture of the interior of the shopping device 6 can be photographed, the touchscreen computer 13 receives the barcode information sent by the code-scanning device 9, and the algorithm is started. First, a quadrangular frame is drawn along the four sides of the shopping device 6 on the screen of the touchscreen computer 13 as a warning frame A of the shopping device 6.

3-2) Before the user starts shopping, that is, when no commodities appear above the shopping device 6, a picture of the shopping device is captured at this moment by the monitoring device installed on the touchscreen computer 13, as the background image before the next shopping, and recorded as the background picture P1.

3-3) When the user is in shopping, the barcode printed on the commodity to be purchased is placed in the infrared code-scanning area in front of the touchscreen computer 13 for scanning, and when the code-scanning device 9 scans the barcode or the two-dimensional code and identifies the information of the commodity, the monitoring device 8 captures the screen containing the target commodity at this moment and records it as P2.

3-4) The background image P1 is subtracted from the picture P2 containing the target commodity to obtain an initial region R1 of the target commodity. At the moment, R1 is within the range of the warning frame A of shopping device 6 monitored by the monitoring device 8, that is, R1 is included in A.

3-5) In the following time, the mean shift algorithm is used to track the region R1 in each frame of video, frame by frame. If region R1 does not belong to A, the target commodity is determined to be out of bounds and not placed in the shopping device 6 of the intelligent shopping cart. If R1 always belongs to A within the predetermined time, shopping is determined to be successful and the target commodity is placed in shopping device 6.

In some embodiments, the commodities are added to the shopping list displayed on the touchscreen computer 13 when both the weight algorithm and the video algorithm identify that the commodities are placed in the shopping device.

In some embodiments, the commodities are deleted from the shopping list displayed on the touchscreen computer 13 when both the weight algorithm and the video algorithm identify that the commodities are taken out from the shopping device.

In some embodiments, after the user aims the barcode of the commodity at the code-scanning device on the intelligent shopping cart for scanning, the monitoring device starts to collect image information, and sends all the collected image information to the server, and the server uses the image identification algorithm to store the data. This algorithm is configured inside the touchscreen computer for processing, without the need of the operation of transmitting the image information to the server, which can reduce the network pressure of the supermarket.

When identification results of the above-described weight algorithm and video algorithm are inconsistent, the touchscreen computer 13 prompts the user to re-operate.

In some embodiments, the intelligent shopping system further includes an ultra-high-frequency radio frequency reader arranged at an exit/entrance of the supermarket and in a communication connection to the server. The ultra-high-frequency radio frequency reader is configured to read the number information of the intelligent shopping cart stored on the RFID tag 7 and send the number information to the server. The server, interacting with the touchscreen computer 13, is configured to store the original information of the commodities, receive the on-site information sent by devices connected to the intelligent terminal device 3, compare the on-site information with the corresponding original information, and finally send the prompt information obtained after comparison to the touchscreen computer 13. Regardless of the weight identification algorithm or the video identification algorithm of the commodities, the on-site information should be compared with the original information of the commodities. According to the traditional habits of the supermarket and the settings of this system, the raw data of the commodities are stored in the server. The information can also be stored in a memory of the touchscreen computer. When the commodity information on the server is changed, the touchscreen computer on the shopping cart is updated in real time to ensure the consistency of the original information of the commodity on the touchscreen computer and the server.

In some embodiments, a method for implementing the above-described intelligent shopping system is as follows.

When the user enters the supermarket entrance, the RFID tag 7 at the front end of the intelligent shopping cart is read by the ultra-high-frequency radio frequency reader arranged at the entrance to record the cart information of the intelligent shopping cart. Then, the user login is performed by inputting the mobile phone number, scanning the personal QR code, or scanning the scan code by WeChat through the touchscreen computer 13 on the intelligent shopping cart; and the touchscreen computer 13 is in a communication connection to the server to obtain the basic information of the user. Meanwhile, the initial total weight $m_1$ of the user and the intelligent shopping cart when entering the supermarket is weighed by the loadometer arranged at the supermarket entrance.

After the user selects one commodity, there are two ways to read the information of the commodity: 1. making the smart bracelet on user's wrist to close to the price tag of the commodity, then reading the commodity information by the RFID tag reader internally provided in the smart bracelet by an non-contact manner, and sending the information to the intelligent shopping cart through the wireless Bluetooth technology; 2. placing the barcode of the commodity in front of the code-scanning device 6, and transmitting the information to the touchscreen computer 13.

Finally, the intelligent shopping cart is connected to the server of the supermarket through the network to obtain the commodity information and display it on the screen of the touchscreen computer 13. After the commodity information is read, the commodity can be placed in the shopping device 6.

Each time a commodity is placed, when the user places the commodity in the shopping device 6, the weight sensor 5 at the bottom of the intelligent shopping cart will sense that an object is placed in. When stable weight information of the commodity is obtained, the weight value is sent to the touchscreen computer 13 of the intelligent shopping cart, meanwhile, the image information of the placed commodity is acquired and collected by each monitoring device 8 to be sent to the touchscreen computer 13 for tracking analysis, and then the obtained weight information and image information is compared with the original information stored in the database. If the commodity information is inconsistent with the original information, a comparison result is transmitted to the server through the network for recording, meanwhile, the user is prompted that the placed commodity is wrong by the touchscreen computer 13, and the user is prompted that the correct commodity needs to be re-put by the voice broadcasting device 11. If the user puts the inconsistent commodities for many times, the shopping cart can be locked, the user is prohibited from entering and exiting, and alerting is sent to the supermarket management personnel. When the on-site recorded information is consistent with the information stored in the database of the server, the on-site recorded information is sent to the touchscreen computer 13, and the selected commodity is added into the commodity purchase list.

As a preferred solution in this embodiment, after several commodities are placed in, the total weight $m_2$ of the accumulated commodities and the image information of each commodity are obtained. When the user completes the shopping and moves towards the automatic settlement exit; the information of the RFID tag 7 in front of the intelligent shopping cart is read through the ultra-high-frequency radio frequency reader; and the total weight of the user, the placed commodities and the intelligent shopping cart is weighed through the loadometer before the gate to obtain the final total weight information $m_0$. Meanwhile, the information is sent to the server; and weight check and calculation is performed by comparing the sum of the initial total weight $m_1$ of the user and the intelligent shopping cart weighted when entering the supermarket and the total weight information $m_2$ of the purchased commodities with the final total weight information $m_0$.

If $m_1+m_2=m_0$, a payment confirmation message is sent to the user's smartphone through the server to prompt the user whether the total price of the purchased commodities is paid; and the user pays through the smartphone or the NFC payment device 14 on the intelligent shopping cart; after the payment is completed, the exit gate is opened; and if $m_1+m_2 \neq m_0$, it means that there is an abnormality, an alarm message is sent to prompt the security inspector to check. When the abnormality has been removed and the payment is completed, the exit gate is opened; and the user is prompted to take the personal belongings and this shopping is over by the voice broadcasting device 11.

In addition, when users purchase commodity, they are troubled by the fact that they cannot find the place where the goods are placed, and often need to find someone to ask. The positioning device 12 receives a signal sent by the positioning tag arranged in the supermarket and sends to the intelligent terminal device 3; the intelligent terminal device retrieves the pre-stored map data to plan the path; and then the touchscreen computer 13 can load the map to formulate a route for the user, and can also implement the push of promotional advertisements in the positioning region.

It should be understood that various portions of the present invention may be implemented by hardware, software, firmware or a combination thereof. In the above-described embodiments, multiple steps or methods may be implemented by software or firmware that is stored in a memory and executed by an appropriate instruction execution system. For example, if the multiple steps or methods are implemented by hardware, as in another embodiment, they can be implemented by any one or combination of the following techniques well known in the art: discrete logic circuit with logic gate circuit for implementing logic functions on data signals, application-specific integrated circuit with appropriate combination logic gate circuit, programmable gate array (PGA), field programmable gate array (FPGA), etc.

In the description of the present specification, the description of reference terms "one embodiment", "some embodiments", "example", "specific example", "some examples", etc. means that specific features, structures, materials or characteristics described by the embodiments or examples are included in at least one embodiment or example of the invention. In the present specification, the exemplary illustrations of the above terms do not necessarily refer to the same embodiment or example. Furthermore, the described specific features, structures, materials, or characteristics may be combined in an appropriate manner in any one or more embodiments or examples.

In general, the various embodiments of the present disclosure can be implemented by hardware or special purpose circuits, software, logic, or any combination thereof. Some aspects can be implemented by hardware, while others can be implemented by firmware or software. The firmware or software can be executed by a controller, microprocessor or other computing device. Although various aspects of the present disclosure are shown and described as a block diagram, a flow diagram, or represented through some other drawings, it should be understood that the blocks, devices, systems, techniques, or methods described herein may be implemented in a non-limiting manner by hardware, software, firmware, special purpose circuits or logic, general purpose hardware or controller or other computing devices, or some combinations thereof. In addition, although the operations are described in a particular order, this should not be construed that such operations are required to be performed in the illustrated order or in a sequential sequence, or that all illustrated operations are performed to achieve the desired results. In some cases, multitasking or parallel processing may be advantageous. Similarly, although the details of several specific implementations are included in the above discussion, these should not be construed as any limitation to the scope of the present disclosure, but rather the descriptions of the features are only for specific embodiments. Certain features described in some separate embodiments can also be implemented in combination in a single embodiment. Conversely, various features described in a single embodiment can also be implemented separately or in any appropriate sub-combination in multiple embodiments.

What is claimed is:

1. An intelligent shopping cart, comprising:
a cart body, wherein the cart body comprises a storage unit and a handle; and
an intelligent terminal device configured on the handle; wherein
the intelligent terminal device is provided with a touchscreen computer having a display function and/or an operation function;
the cart body is provided with an RFID tag for storing number information of the intelligent shopping cart;
the cart body is provided with a device in a communication connection to the touchscreen computer, and the device comprises a weight sensor, a plurality of monitoring devices, a code-scanning device, a positioning device, and a voice broadcasting device; and wherein the weight sensor is configured to collect weight information of a commodity and send the weight information to the touchscreen computer;
the plurality of monitoring devices are configured to read barcode information of the commodity and/or record image information of the commodity, and send the barcode information and the image information to the touchscreen computer;
the code-scanning device is configured to read the barcode information of the commodity, and send the barcode information to the touchscreen computer;
the positioning device is configured to receive a signal sent by an LED positioning light arranged in a supermarket, decode the signal and send a decoded signal to the touchscreen computer;
the voice broadcasting device is configured to play a voice prompt of a shopping operation to a user;
the touchscreen computer is configured to receive the weight information of the commodity, the barcode information of the commodity and/or the image information of the commodity, send out, and display the weight information, the barcode information and/or the image information of the commodity after receiving a confirmation instruction; or
the touch screen computer is configured to receive and compare the weight information of the commodity, the barcode information of the commodity and/or the image information of the commodity, with original information of the commodity, and then display comparison information of the commodity;
when the intelligent shopping cart is in a stationary state, values collected by the weight sensor are all started with "st", and the collected values can be used as an actual total weight of commodities;
when the intelligent shopping cart moves smoothly, an average value of several weight data collected by the weight sensor within 2 seconds is taken as the actual total weight of the commodities;
when the intelligent shopping cart is moving strenuously, the values collected by the weight sensor cannot be used as the actual total weight of the commodities; and
when the intelligent shopping cart changes from a moving state to the stationary state, and the weight sensor collects six consecutive and identical values starting with "st", then weight values read by the weight sensor are determined as stable and accurate, and the weight values are used as the actual total weight of the commodities;
when the intelligent shopping cart is in an unlocking state, the total weight of the commodities in the shopping cart is continuously detected in real time by the weight sensor;
after continuously detecting and obtaining a total weight mn+1 of the commodities in the shopping cart by the weight sensor, the total weight mn+1 of the commodities is compared with a total weight mn of the commodities obtained after a previous selection behavior is completed to obtain a variation value mΔ of the total weight of the commodities; when mΔ>0, determining that the commodities to be purchased are placed in the intelligent shopping cart; when mΔ<0, determining that the commodities to be purchased are taken out from the shopping cart; and
when mΔ=0, determining that there is no operation on the commodities to be purchased.

2. The intelligent shopping cart according to claim 1, further comprising a smart bracelet in a communication connection to the touchscreen computer, and the smart bracelet is internally provided with an RFID tag reader for a non-contact reading of price information of the commodity, and transmitting the price information to display on the touch screen computer.

3. The intelligent shopping cart according to claim 1, wherein the intelligent shopping cart is further provided with a charging device, and the charging device is configured to cooperate with an external charging equipment to provide electric energy for components of the intelligent shopping cart requiring power supply driving.

4. The intelligent shopping cart according to claim 1, wherein the intelligent terminal device is provided with an NFC payment device for payment.

\* \* \* \* \*